(12) United States Patent
Adhav et al.

(10) Patent No.: US 12,355,729 B2
(45) Date of Patent: Jul. 8, 2025

(54) VPC AUTO-PEERING

(71) Applicant: Google LLC, Mountain View, CA (US)

(72) Inventors: Gargi Adhav, San Jose, CA (US);
Vineet Goel, Mountain View, CA (US);
Pavlin Radoslavov, Cupertino, CA (US)

(73) Assignee: Google LLC, Mountain View, CA (US)

( * ) Notice: Subject to any disclaimer, the term of this patent is extended or adjusted under 35 U.S.C. 154(b) by 429 days.

(21) Appl. No.: 17/768,640

(22) PCT Filed: Oct. 30, 2020

(86) PCT No.: PCT/US2020/058111
§ 371 (c)(1),
(2) Date: Apr. 13, 2022

(87) PCT Pub. No.: WO2021/087199
PCT Pub. Date: May 6, 2021

(65) Prior Publication Data
US 2023/0144202 A1 May 11, 2023

Related U.S. Application Data

(60) Provisional application No. 62/929,392, filed on Nov. 1, 2019.

(51) Int. Cl.
*H04L 9/40* (2022.01)
*H04L 12/46* (2006.01)
*H04L 67/104* (2022.01)

(52) U.S. Cl.
CPC ...... *H04L 63/0272* (2013.01); *H04L 12/4641* (2013.01); *H04L 67/1059* (2013.01)

(58) Field of Classification Search
CPC ....... G06F 2009/45595; G06F 9/45558; H04L 12/4641; H04L 63/0272; H04L 63/20; H04L 67/1059
See application file for complete search history.

(56) References Cited

U.S. PATENT DOCUMENTS 10,310,966 B1 6/2019 Ge et al.
10,735,263 B1 * 8/2020 McAlary ............... H04L 45/028
(Continued)

FOREIGN PATENT DOCUMENTS

WO 2016181201 A1 11/2016
WO 2019085311 A1 5/2019
(Continued)

OTHER PUBLICATIONS

Notice of Grant for Chinese Patent Application No. 202080071464.5 dated Dec. 14, 2023. 4 pages.
(Continued)

*Primary Examiner* — Olugbenga O Idowu
(74) *Attorney, Agent, or Firm* — Lerner David LLP (57) ABSTRACT

The present disclosure provides for automatic peering between virtual networks, such as virtual private clouds (VPCs). A VPC may be configured to operate in an "auto-peering" mode, allowing for automatic peering to be turned on or off. When auto-peering is turned on, that VPC may seek connections with other VPCs, such as other VPCs matching one or more predefined policies. In addition, the particular VPC with auto-peering turned on may be open to accept connection requests from other VPCs matching one or more predefined policies. The policies for requesting connection may be the same as or different than the policies for accepting connection requests. According to some examples, the VPC may be set to a "listening" mode, in which it is open to peering with any other VPC that matches a predefined policy, but is not actively seeking to establish other connections.

19 Claims, 9 Drawing Sheets

(56) References Cited

U.S. PATENT DOCUMENTS

| | | | |
|---|---|---|---|
| 11,240,203 B1* | 2/2022 | Eyada | H04L 63/20 |
| 2014/0173755 A1 | 6/2014 | Wahl | |
| 2017/0098092 A1 | 4/2017 | Nachenberg et al. | |
| 2017/0214659 A1 | 7/2017 | Madhav et al. | |
| 2019/0109777 A1* | 4/2019 | Mircescu | H04L 67/104 |

FOREIGN PATENT DOCUMENTS

| | | | |
|---|---|---|---|
| WO | 2019161206 A1 | 8/2019 | |
| WO | 2019164907 A1 | 8/2019 | |

OTHER PUBLICATIONS

Office Action for European Patent Application No. 20811881.0 dated Apr. 11, 2024. 7 pages.
Morad, S., "Amazon Virtual Private Cloud Connectivity Options", Amazon Web Services, Jul. 2014. pp. 1-31.
Amazon Virtual Private Cloud: User Guide. Jan. 21, 2017. pp. 1-279. Retrieved on Mar. 16, 2018. Retrieved from the Internet: <https://web.archive.org/web/20170121164746/https://docs.aws.amazon.com/AmazonVPC/latest/UserGuidefvpc-ug.pdf>.
International Search Report and Written Opinion for International Application No. PCT/US2020/058111 dated Feb. 16, 2021. 15 pages.
Office Action for Chinese Patent Application No. 202080071464.5 dated Mar. 2, 2023. 8 pages.
International Preliminary Report on Patentability for International Application No. PCT/US2020/058111 dated May 12, 2022. 8 pages.

* cited by examiner

VPC AUTO-PEERING

CROSS-REFERENCE TO RELATED APPLICATIONS

The present application is a national phase entry under 35 U.S.C. § 371 of International Application No. PCT/US2020/058111, filed Oct. 30, 2020, which claims the benefit of the filing date of U.S. Provisional Application No. 62/929,392, filed Nov. 1, 2019, entitled VPC Auto-Peering, the entire disclosures of which are hereby incorporated herein by reference.

BACKGROUND

Currently, if cloud customers want to create a network of virtual private clouds (VPCs) peered with each other, they must explicitly configure connections on both sides of the peering. In particular, each VPC must specify an explicit peering configuration towards the other VPC, which can result in a large number of explicit configurations for the cloud customer to setup. For example, if a VPC hub was to connect with 600 other VPCs, the VPC hub would require 600 configurations and each of the 600 other VPCs would require its own configuration. In addition to creating the configurations, the configurations must be maintained. The larger the number of peerings, the more effort is required in creating and maintaining configurations.

BRIEF SUMMARY

The present disclosure provides a possible way to create auto-peering relationships between virtual networks, such as VPCs, without the need for explicit bi-directional configuration. In this regard, customers are provided with an easy, abbreviated way to automatically create a large number of peerings through policy.

One aspect of the disclosure provides a method, including operating, by a first virtual private cloud (VPC), in a first mode, wherein the first mode enables automatic peering with a second VPC, identifying, by the first VPC, a second VPC, automatically requesting, by the first VPC without operator intervention, to initiate peering with the second VPC, and establishing, by the first VPC, the peering connection when the request is accepted by the second VPC.

According to some examples, the method may further include determining, by the first VPC, whether the identified second VPC meets one or more predefined policies. The one or more predefined policies may specify whether an organization in which the second VPC is included is approved for peering. According to some examples, the one or more predetermined policies may further specify whether a project in the organization in which the second VPC is included is approved for peering. In some examples, the one or more policies limit exchange of subnets and routes.

According to some implementations, the method may further include pushing an automatic peering filtering policy to the second VPC.

The second VPC may be operating in either the first mode or in a second mode, wherein the second VPC listens for automatic peering requests.

Another aspect of the disclosure provides a method, including operating, by a second virtual private cloud (VPC), in a second mode, wherein the second VPC in the second mode listens for automatic peering requests from a first VPC, receiving, by the second VPC, a request from the first VPC to initiate peering with the second VPC, determining, by the second VPC, whether to peer with the first VPC based on one or more policies, and automatically peering, by the second VPC without operator intervention, with the first VPC when the first VPC is approved according to the one or more policies.

According to some examples, the one or more policies may specify whether an organization in which the first VPC is included is approved for peering. The one or more policies may further specify whether a project in the organization in which the first VPC is included is approved for peering.

In some examples, the one or more policies may limit exchange of subnets and routes. The method may further include pushing an automatic peering filtering policy to the first VPC. The first VPC may operate in a first mode in which automatic peering is enabled.

Yet another aspect of the disclosure provides a system, including a plurality of virtual machines in a first virtual private cloud (VPC), a controller coupled to the plurality of virtual machines. The controller includes one or more processors configured to operate the first VPC in a first mode, wherein the first mode enables automatic peering with a second VPC, identify a second VPC, automatically request, by the first VPC without operator intervention, to initiate peering with the second VPC, and establish the peering connection between the first VPC and the second VPC when the request is accepted by the second VPC.

In some implementations, the one or more processors are further configured to determine whether the identified second VPC meets one or more predefined policies. The one or more predefined policies may specify whether an organization in which the second VPC is included is approved for peering. The one or more predetermined policies may further specify whether a project in the organization in which the second VPC is included is approved for peering. The one or more policies may limit exchange of subnets and routes.

According to some examples, the one or more processors are further configured to push an automatic peering filtering policy to the second VPC.

In some implementations, the controller may be further configured to operate the first VPC to identify a third VPC, automatically request, by the first VPC without operator intervention, to initiate peering with the third VPC, and establish the peering connection between the first VPC and the third VPC when the request is accepted by the third VPC.

DETAILED DESCRIPTION

Figure 1A:
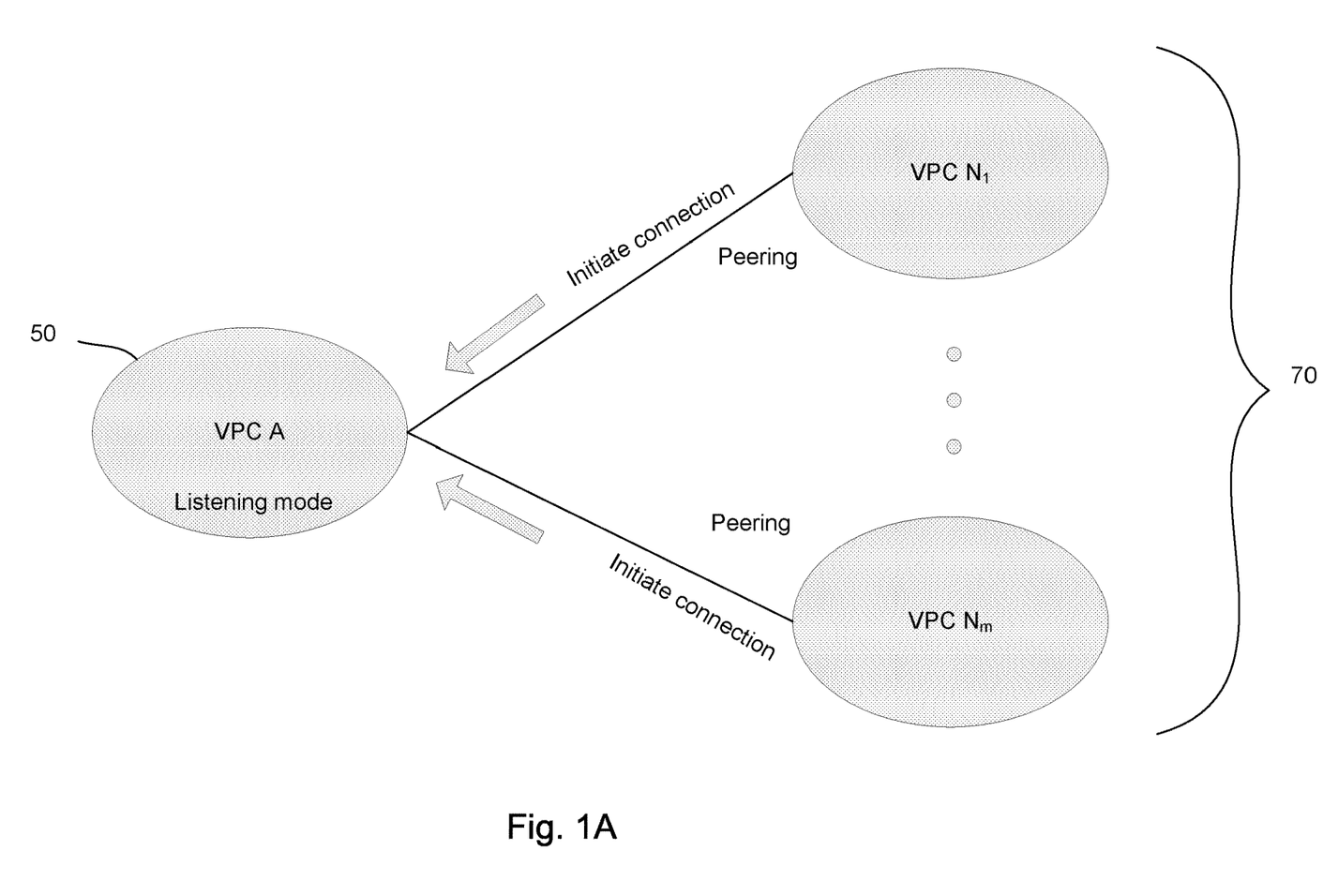
FIG. 1A is a block diagram illustrating an example of automatic peering according to aspects of the disclosure.

FIG. 1A illustrates an example of automatic peering between VPCs. The auto-peering is created at a VPC level, and is a VPC-level configuration. While the examples herein describe automatic peering between VPCs, it should be understood that the VPCs may include any of a variety of types of virtual network.

The VPCs may be configured to operate in one or more modes. For example, a VPC may have an "auto-peering" mode, allowing for automatic peering to be turned on or off. When auto-peering is turned on for a particular VPC, that VPC may seek connections with other VPCs, such as other VPCs matching one or more predefined policies. In addition, the particular VPC with auto-peering turned on may be open to accept connection requests from other VPCs matching one or more predefined policies. The policies for requesting connection may be the same as or different than the policies for accepting connection requests. According to some examples, a VPC may be set to a "listening" mode, in which it is open to peering with any other VPC that matches a predefined policy, but is not actively seeking to establish other connections.

According to some examples, a VPC's peering mode (automatic and/or listening) can vary based on peering policy. For example, VPC A could operate in listening mode for peering requests from VPCs with names starting with the letter 'b', in peering only, e.g., connection-seeking only, mode for VPCs with names starting with the letter "c", and in peering+listening mode for VPCs having names starting with "d".

As shown in FIG. 1A, VPC A 50 may be set to listening mode. As such, VPC A 50 is open to accepting requests from other VPCs 70, such as VPC $N_1$, VPC $N_m$, etc. While only a few other VPCs 70 are shown, it should be understood that the VPC A 50 may accept connections from any number of other VPCs.

The VPC A 50 may determine whether or not to accept connection from the other VPCs 70. For example, the VPC A 50 may determine whether another VPC, such as VPC $N_1$, matches a predefined policy.

According to one example, the policies may include import/export filtering policies for limiting the sharing of subnets & routes between peered VPCs. Such policies may include one or more rules for accepting connection requests. Such rules may specify, for example, specific organizations, projects within the organizations, and/or VPCs within the projects that are approved for connection. According to some examples, such policies may include access rights. For example, such access rights may be assigned by an organization to which the VPC belongs or other entity having control over the VPC.

While some policies may specify that any VPCs within a given organization are approved, for example, other policies may specify that only a select few VPCs within a particular project of another organization are approved. Moreover, some policies may expressly indicate particular VPCs, projects, or organizations for which connection requests should be denied.

Figure 1B:
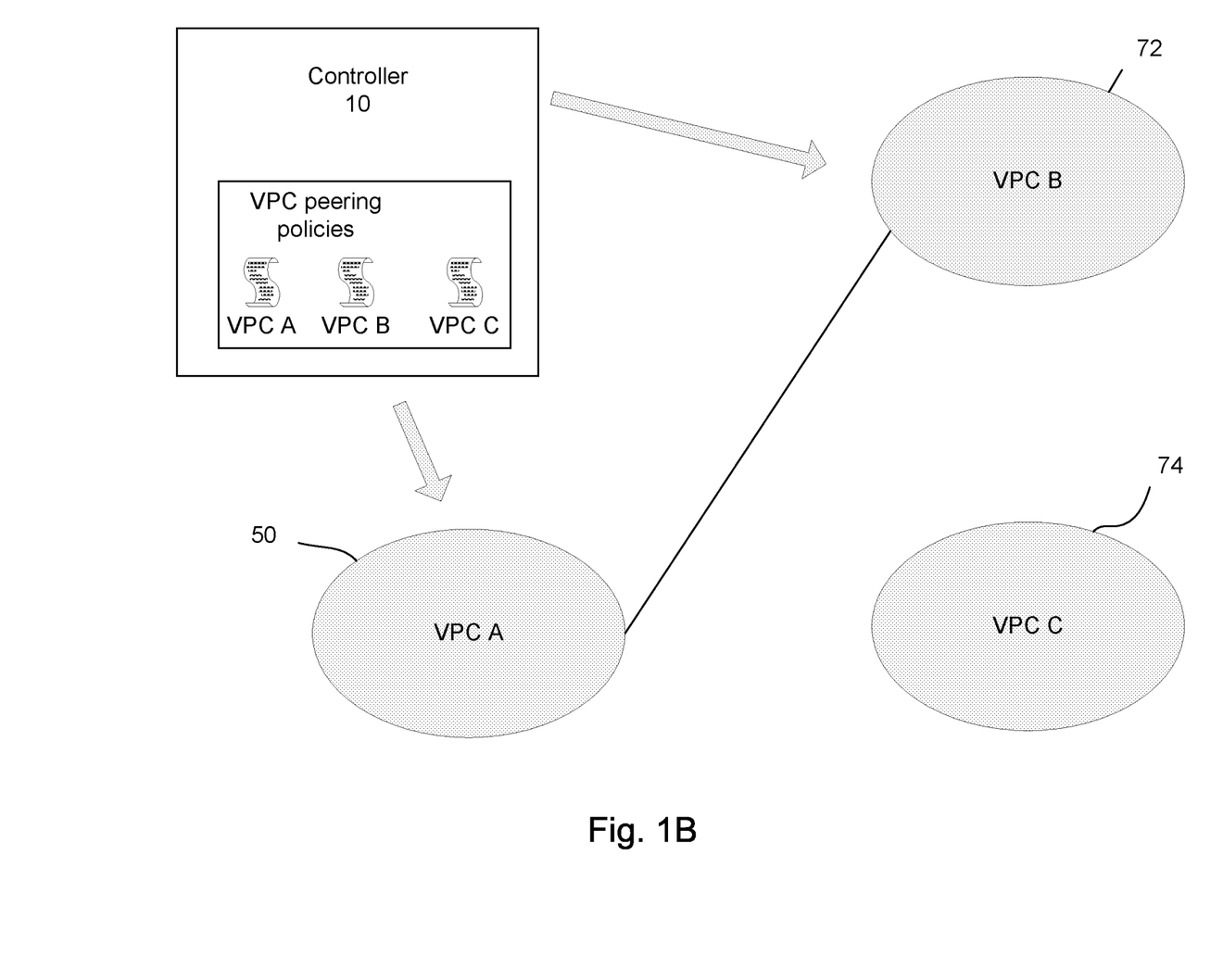
FIG. 1B is a block diagram illustrating an example of automatic peering using a controller for policy matching according to aspects of the disclosure.

FIG. 1B illustrates another example, wherein a controller 10 facilitates automatic peering between VPCs. For example, each VPC 50, 72, 74 may have an associated peering policy. The peering policy may provide rules for the peering that is allowed by the associated VPC. For example, the rules may indicate other particular VPCs that are allowed, other types of VPCs, locations, owners, or other information corresponding to the VPCs. The policies may be stored at each VPC 50, 72, 74, at the controller 10, or independently in a memory device accessible by the controller 10.

The controller 10 may access the peering policies of the VPCs, and compare them. Based on the comparison, the controller 10 may determine which of the VPCs 50, 72, 74 can establish peering with one another. In the example shown, the controller 10 determines that the peering policy of VPC A 50 allows for peering with VPC B 72, and that the peering policy of VPC B 72 allows for peering with VPC A 50. Accordingly, the controller indicates to the VOCs 50, 72 that they may peer with one another. This indication may include, for example, a message or instructions transmitted from the controller to the VPC 50, 72. In other examples, the indication may be stored at the controller 10 or elsewhere at an address that can be periodically accessed by the VPCs to identify the determined peerings that are allowed.

Figure 1C:
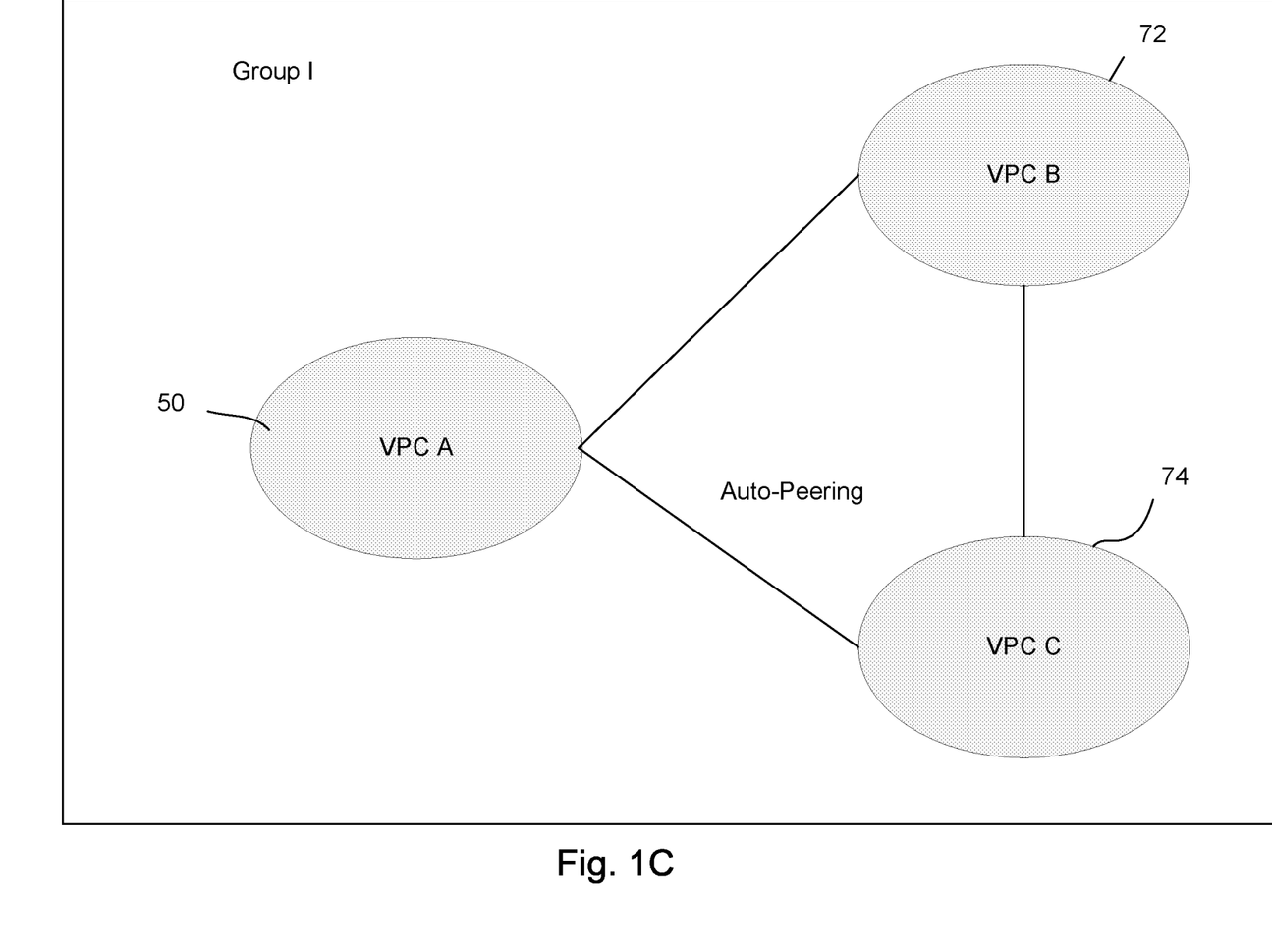
FIG. 1C is a block diagram illustrating an example of automatic peering within user-defined groups according to aspects of the disclosure.

FIG. 1C is a block diagram illustrating an example of automatic peering within a group. For example, groups of VPCs may be defined by users, such as administrators of organizations or other types of users. The VPCs may be added to the group based on any of a number of characteristics of the VPCs, such as policies, owners, locations, utilization, types of applications or jobs handled, etc.

When one or more VPCs are added to a group, the VPCs may automatically peer with the others within the group. For example, as shown, the group includes VPC A 50, VPC B 72, and VPC C 74. In some examples, the VPCs 50, 72, 74 may be notified of their inclusion in the group, and may be notified of the other VPCs in the group. Accordingly, each of these VPCs 50, 72, 74 may peer with each other VPC in the group.

Figure 2:
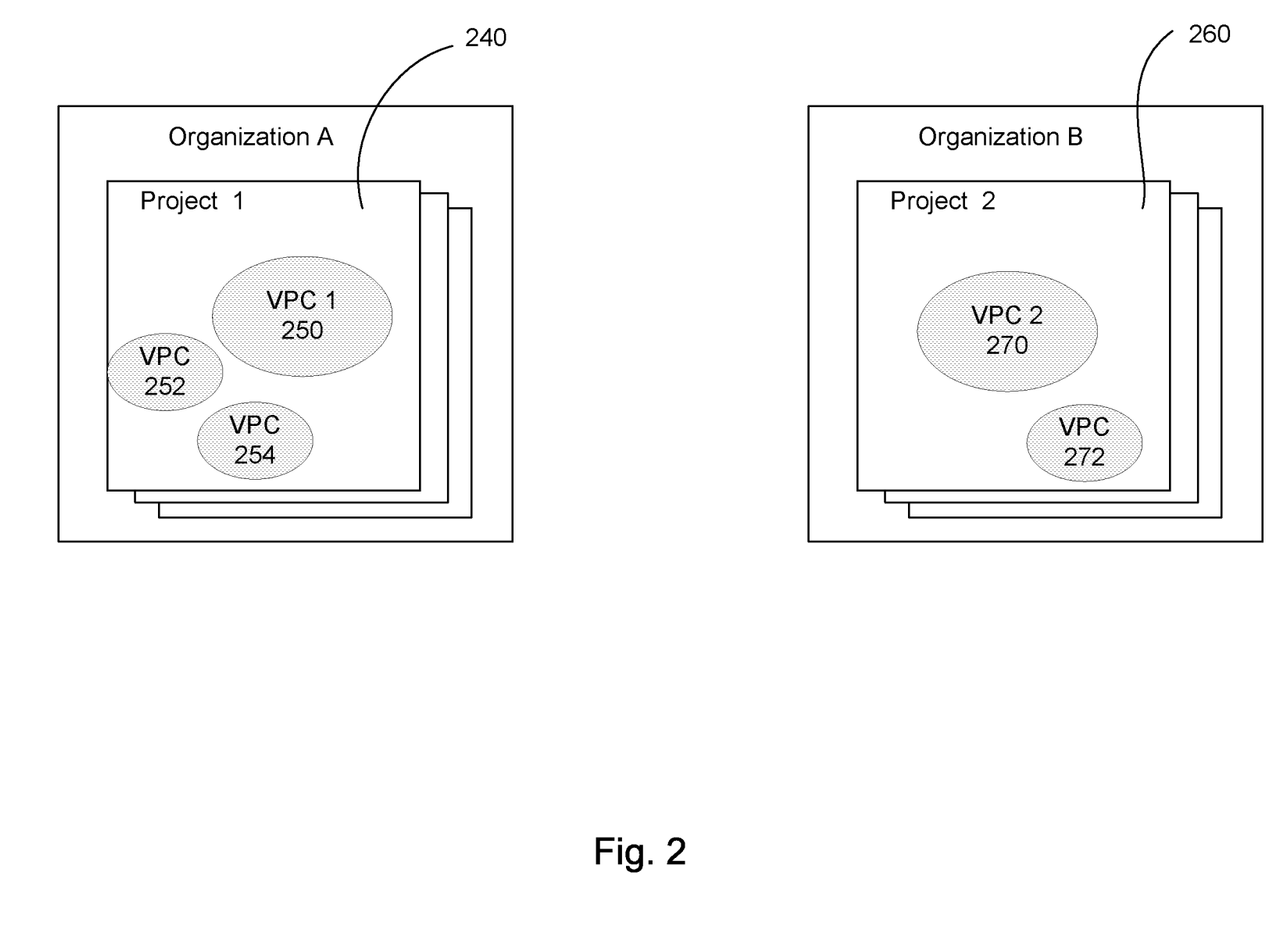
FIG. 2 is a relational block diagram illustrating different VPCs according to aspects of the disclosure.

Referring to FIG. 2, for example, Organization A may include a number of projects 240. Organization A may be, for example, a company with operations in one or more physical locations/buildings, an enterprise, or any other business, association, or the like. According to some examples, the Organization A may be represented by a unique organization identifier that is recognizable by other organizations, such as Organization B.

Each of the projects 240 may be, for example, a subsidiary or other subunit of the organization, a product or application, a department, team, platform, etc. Each project may include one or more VPCs 250-254. While a few VPCs are shown in FIG. 2, it should be understood that any number of VPCs may be included in a given project. Moreover, a given VPC may in some instances be included in multiple different projects within the organization at the same time.

Similar to Organization A, a separate Organization B may include one or more projects 260, each project including zero or more VPCs 270, 272. Organization B may be unrelated to Organization A. In other examples, Organization B may do business with Organization A or otherwise utilize information from Organization A. By way of example only, Organization A may be a company that offers a database service (project 1), whereas Organization B may be a separate company with a web frontend (project 2) that uses the database service. Accordingly, VPC 270 of Organization B may seek to connect with VPC 250 of Organization A.

If the VPCs no longer need to have explicit peering configurations, a local filtering policy may be implemented. The local filtering policy may be a filtering policy that limits the exchange of subnets & routes, and it may be applied at the VPC configuration level.

According to another example, the policies may include a peer filtering policy. Referring back to FIG. 1A, for example, if the VPC A 50 is only configured to accept auto-peering requests, with no import/export policies, then it may be able to accept a peer filtering policy. In this regard, an initiating VPC 70, e.g., VPC $N_1$, should be able to push an import/export policy to the VPC A 50.

When peering is automatically created, the filtering policies may in some examples be expressed on a creating VPC, such as VPC N1 seeking to initiate a connection with VPC A 50. In other examples, the filtering policies may be expressed on an accepting VPC, such as the VPC A that accepts the request from the VPC N1.

Where the filtering policies are expressed on the creating VPC, the filtering policies for the creating VPC may be configured at the VPC level as auto-peering-local-filtering-policy. The filtering policies for the accepting VPCs may be configured on the creating VPC as auto-peering-peer-filtering-policy.

Where the filtering policies are expressed on the accepting VPC, the accepting VPC could also configure its own local policies for filtering as auto-peering-local-filtering-policy. The accepting VPC could also optionally push a filtering policy to the creating VPC as auto-peering-peer-filtering-policy. A local-policy may take precedence over a peer-filtering-policy pushed by a peer.

In some cases, one VPC may have only a single import/export policy for all its auto-created peers. In other cases, different sets of filtering policies may be applied to different sets of auto-created VPCs. In this case, multiple auto-create/auto-accept policies may be allowed with corresponding filtering policies.

Figure 3:
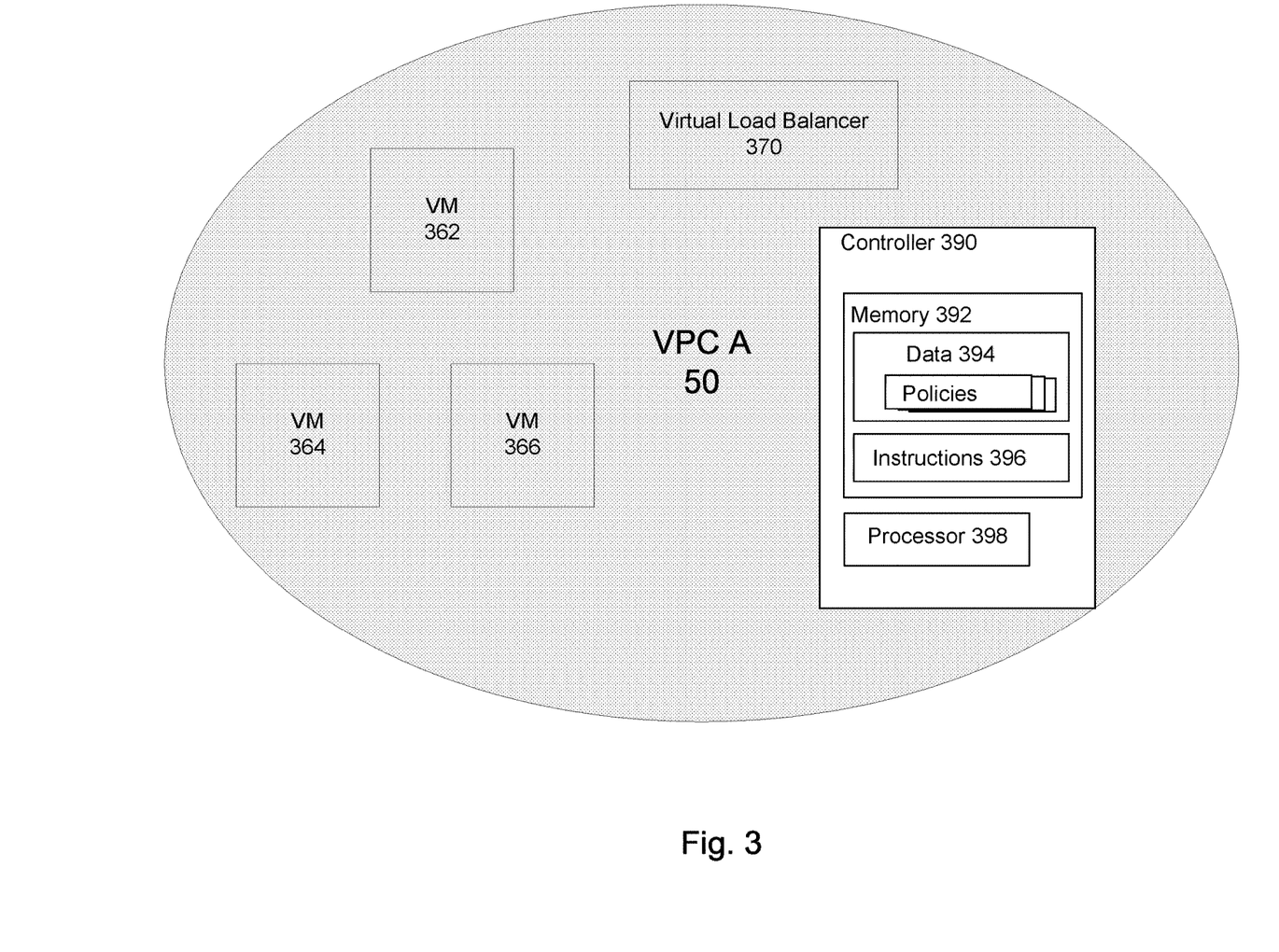
FIG. 3 is a block diagram illustrating components of a VPC according to aspects of the disclosure.

FIG. 3 illustrates an example VPC. The VPC may include a number of computing devices, such as virtual machines 362-366, a load balancer 370, and a controller 390. While only a few of these computing devices are shown, it should be understood that each VPC may include any number of computing devices, and that the number of computing devices in a first VPC may differ from a number of computing devices in a second VPC. Moreover, it should be understood that the number of computing devices in each VPC may vary over time, for example, as hardware is removed, replaced, upgraded, or expanded.

According to some examples, the computing devices may include one or more virtual machines 362-366 running on one or more host machines. Each of the virtual machines 362-366 may run an operating system and applications. While only a few virtual machines 362-366 are illustrated in FIG. 2, it should be understood that any number of virtual machines may be supported by any number of host computing devices. Moreover, it should be understood that the configuration illustrated in FIG. 3 is merely an example, and that the computing devices in each VPC may have various structures and components that may be the same or different from one another.

The load balancer 370 may distribute jobs or tasks among the virtual machines 362-366. For example, the computing devices may have different capacities. For example, the different computing devices may have different processing speeds, workloads, etc. For example, as commands are received to execute new tasks, the load balancer 370 may determine which virtual machine 362-366 is responsible for handling the new task. Moreover, the load balancer 370 may monitor computing capacity of each of the virtual machines 362-366 and make adjustments as needed. For example, if one virtual machine fails, the load balancer 370 may move its processes over to one or more other virtual machines. In other examples, if one virtual machine is near capacity while another has availability, the load balancer 370 may move jobs, or may only send new jobs to the virtual machine with availability.

The controller 390 may communicate with the computing devices in the VPC and in other VPCs. For example, the controller 390 receives connection requests from other VPCs and determines whether to accept the connection. As another example, the controller 390 may look for other VPCs matching predefined policies, and initiate connection requests to those VPCs.

The controller 390 may contain a processor 398, memory 392, and other components typically present in general purpose computers. The memory 392 can store information accessible by the processor 398, including instructions 396 that can be executed by the processor 398. Memory can also include data 394 that can be retrieved, manipulated or stored by the processor 398.

The memory 392 may be a type of non-transitory computer readable medium capable of storing information accessible by the processor 398, such as a hard-drive, solid state drive, tape drive, optical storage, memory card, ROM, RAM, DVD, CD-ROM, write-capable, and read-only memories. The processor 398 can be a well-known processor or other lesser-known types of processors. Alternatively, the processor 398 can be a dedicated controller such as an ASIC.

The instructions 396 can be a set of instructions executed directly, such as machine code, or indirectly, such as scripts, by the processor 398. In this regard, the terms "instructions," "steps" and "programs" can be used interchangeably herein. The instructions 396 can be stored in object code format for direct processing by the processor 398, or other types of computer language including scripts or collections of independent source code modules that are interpreted on demand or compiled in advance.

The data 394 can be retrieved, stored or modified by the processor 398 in accordance with the instructions 396. For instance, although the system and method is not limited by a particular data structure, the data 394 can be stored in computer registers, in a relational database as a table having a plurality of different fields and records, or XML documents. The data 394 can also be formatted in a computer-readable format such as, but not limited to, binary values, ASCII or Unicode. Moreover, the data 394 can include information sufficient to identify relevant information, such as numbers, descriptive text, proprietary codes, pointers, references to data stored in other memories, including other network locations, or information that is used by a function to calculate relevant data.

As shown in the example of FIG. 3, the data 394 may include one or more policies for automatically peering with external VPCs. For example, the policies may include import/export policies, peer filtering policies, local filtering policies, etc. The policies may be accessed to determine whether to initiate or accept a request. According to some examples, the policies may be pushed to external VPCs with which a connection is sought.

Although FIG. 3 functionally illustrates the processor 398 and memory 392 as being within the same block, the processor 398 and memory 392 may actually include multiple processors and memories that may or may not be stored within the same physical housing. For example, some of the instructions 396 and data 394 can be stored on a removable CD-ROM and others within a read-only computer chip. Some or all of the instructions and data can be stored in a location physically remote from, yet still accessible by, the processor 398. Similarly, the processor 398 can actually include a collection of processors, which may or may not operate in parallel.

Figure 4:
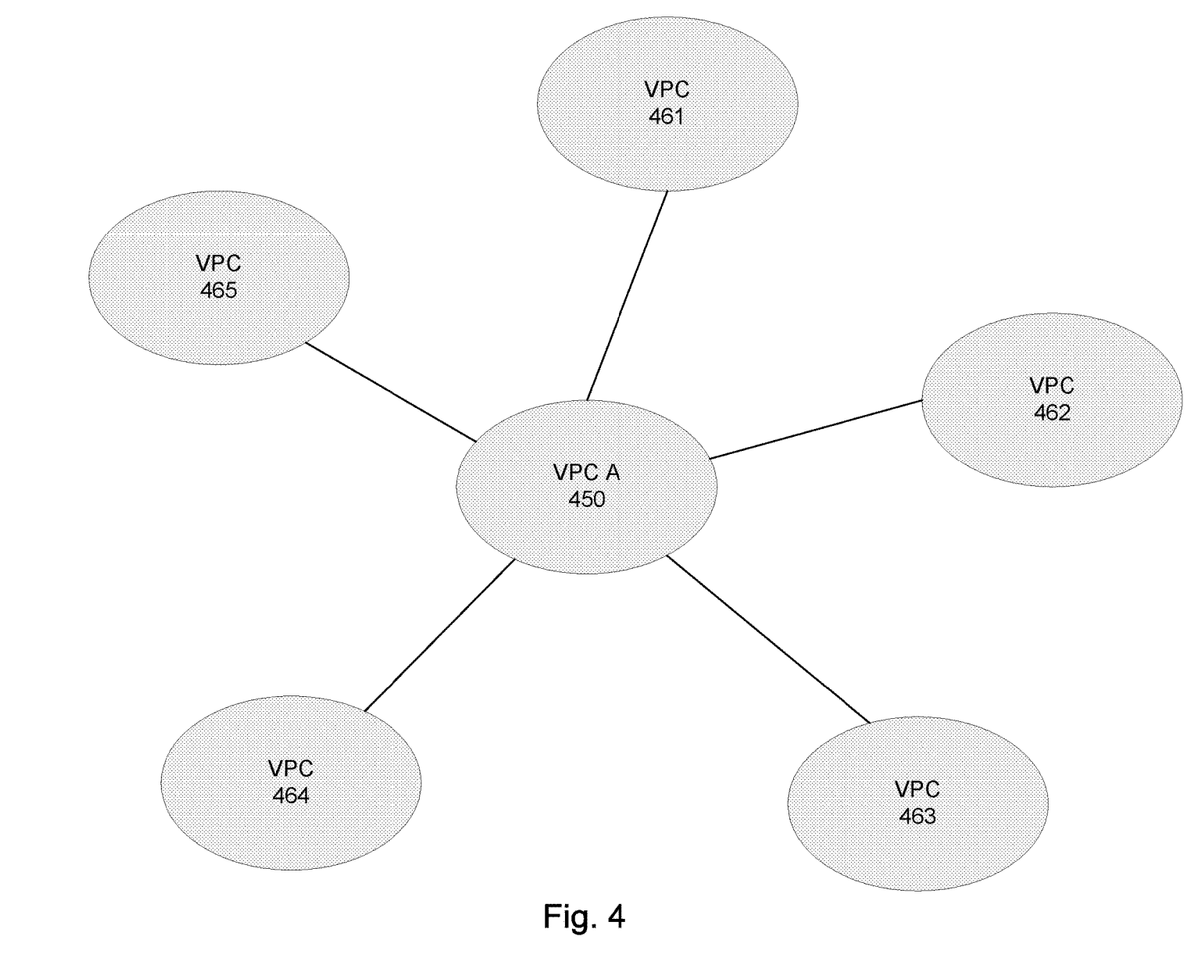
FIG. 4 is a block diagram illustrating an example use case according to aspects of the disclosure.

FIG. 4 illustrates a first example use case, where VPCs are peered in a hub-and-spoke model. For example, VPC A 450 may be the hub. Accordingly, the hub VPC A 450 sets itself to a listening or acceptance mode. The VPC A 450 allows a plurality of "spoke" VPCs 461-465 to connect to it. Each of the spoke VPCs 461-465 may connect to the hub VPC 450 at a different time, for example, as the spoke VPCs 461-465 are established, as they require collaboration with the hub VPC 450, or at any other time. Similarly, the spoke VPCs 461-465 may remain peered with the hub VPC 450 for different durations of time. Accordingly, while in some instances all of the VPCs 461-465 may be peered with the hub VPC 450 at a same time, in other instances only a subset of the spoke VPCs 461-465 may be peered at a given time. In this regard, when multi-tenant services expose a service, new client VPCs can connect to it as they arise and are allowed by IAM policy.

Figure 5:
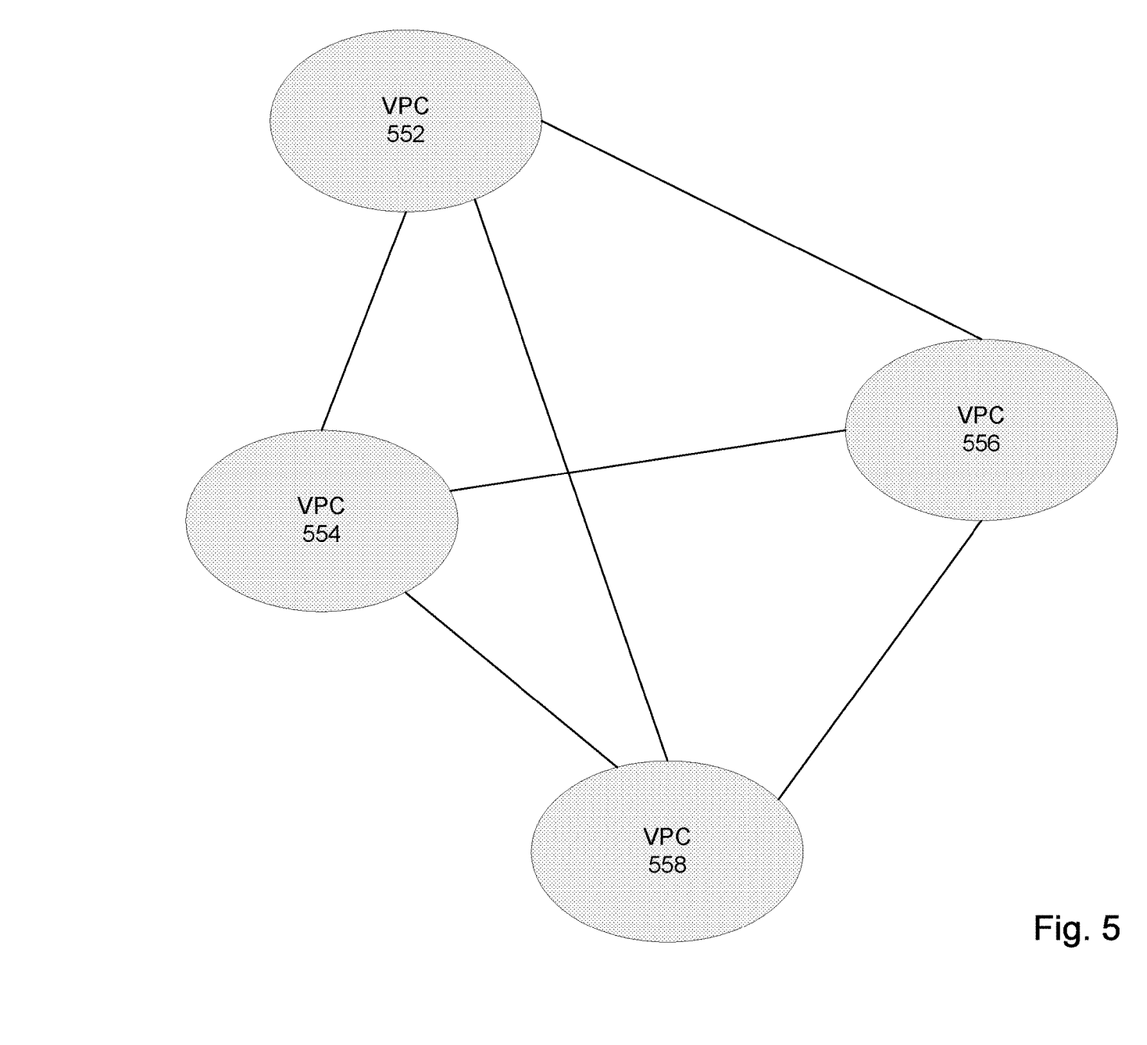
FIG. 5 is a block diagram illustrating another example use case according to aspects of the disclosure.

FIG. 5 illustrates another example use case, where a plurality of VPCs 552-558 are peered in a full-mesh model. In this model, each VPC is peered with each other VPC. For example, all VPCs in an organization may be peered with each other. A policy could be applied on all VPCs 552-558 to create the auto-peerings. In this case, the VPCs on both sides of the peering want to peer, and therefore a distinction between creating VPC or accepting VPC is less relevant. Accordingly, all VPCs 552-558 could configure auto-peering-create and/or auto-peering-accept, and VPCs 552-558 may be able to auto-calculate and create their peerings.

While FIGS. 4 and 5 illustrate two different example use cases, it should be understood that further use cases are also possible. By way of example only, some VPCs may be peered with some other VPCs, such as a mesh model where some VPCs may not be peered with every other VPC.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 6:
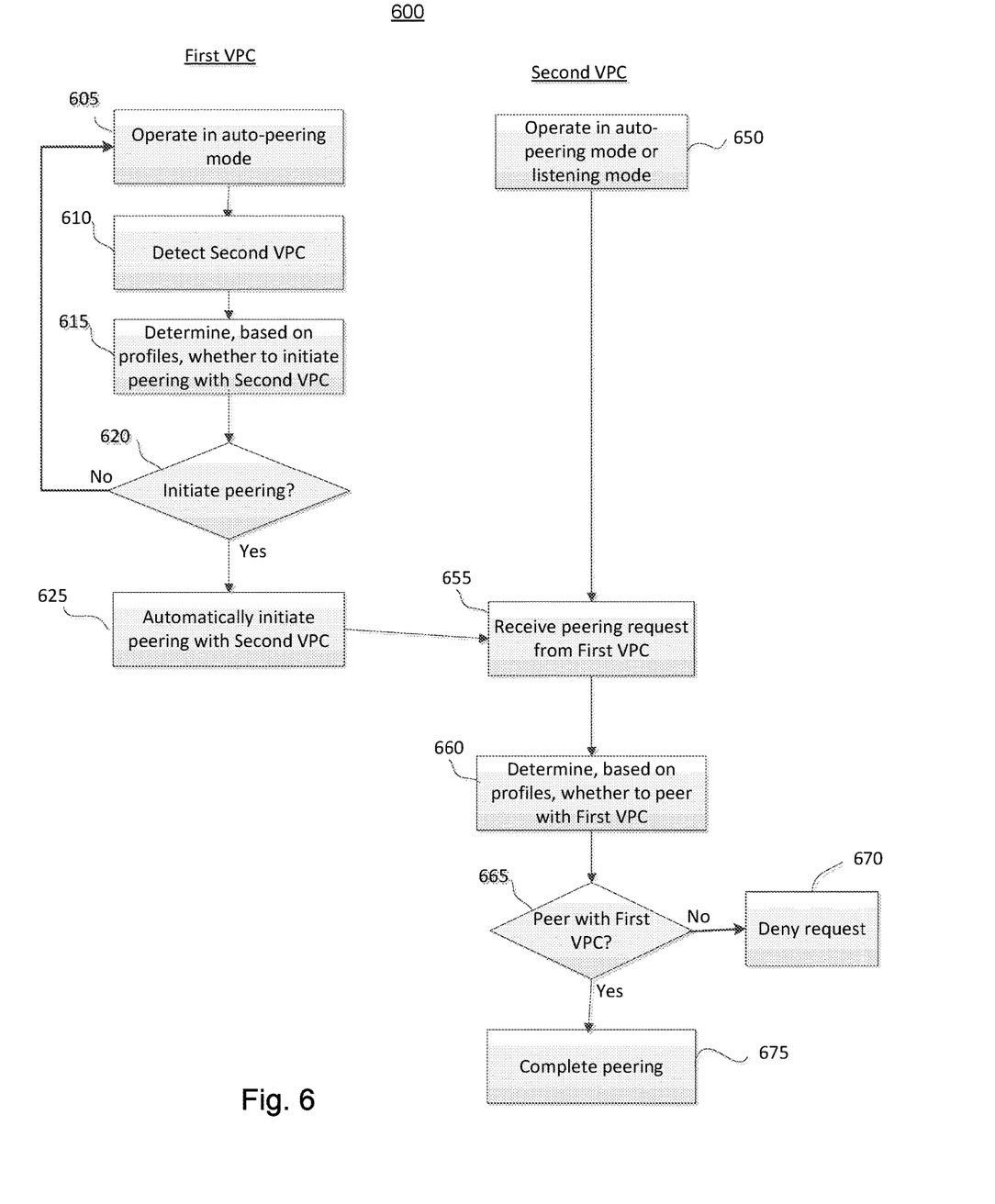
FIG. 6 is a flow diagram illustrating an example method according to aspects of the disclosure.

FIG. 6 illustrates an example method 600 of automatic peering between VPCs. The method 800 may be performed, by way of example only, by a controller within a first VPC and a controller within a second VPC, such as the controller described in connection with FIG. 2.

In block 605, the first VPC operates in an automatic peering mode. In this mode, the first VPC may search for other VPCs that are configured to allow automatic peering. At a same time, in block 650, the second VPC operates in either an automatic peering mode or a listening mode, in which it is configured to accept requests to initiate peering from other VPCs. According to some examples, the second VPC may seek connections and listen for requests in automatic peering mode, but only listen for requests in listening mode.

In block 610, the first VPC may detect the second VPC. For example, the second VPC may broadcast some information that is detectable by the first VPC. According to another example, a centralized configuration model may implement auto-peering. Any of a variety of different mechanisms may be used to detect the second VPC, and in some instances such mechanisms may be dependent on the architecture.

In block 615, the first VPC determines whether to initiate peering with the second VPC. For example, the first VPC references one or more profiles, which may be stored at the VPC or remotely. The one or more profiles include rules for determining which VPCs to initiate peering. For example, the one or more profiles may specify organization identifiers, project identifiers, and/or VPC identifiers for approved VPCs. The one or more profiles may further list particular organizations, projects, or VPCs with which the first VPC should not attempt to initiate peering. In block 620, the first VPC decides whether or not to initiate peering with the second VPC. If it is decided not to initiate peering, the process may return to block 605.

If the first VPC decides to initiate peering in block 620, it will initiate the peering in block 625. For example, the first VPC may send a request to the second VPC. The request may include, for example, information identifying the first VPC. According to some examples, the request may include further information, such as a duration of time for which peering is requested, other VPCs to which the first VPC is peered, etc. In block 655, the second VPC receives the peering request from the first VPC.

In block 660, the second VPC determines whether to peer with the first VPC. For example, the second VPC may consult one or more of its automatic peering profiles. Such profiles may specify particular VPCs with which the second VPC should peer. In specifying the particular VPCs, the profiles may specify organizations, projects, and/or VPCs that are approved or denied.

If the second VPC decides in block 665 not to peer with the first VPC, the request from the first VPC may be denied in block 670. However, if the second VPC decides to peer with the first VPC, peering may be established in block 675.

Figure 7:
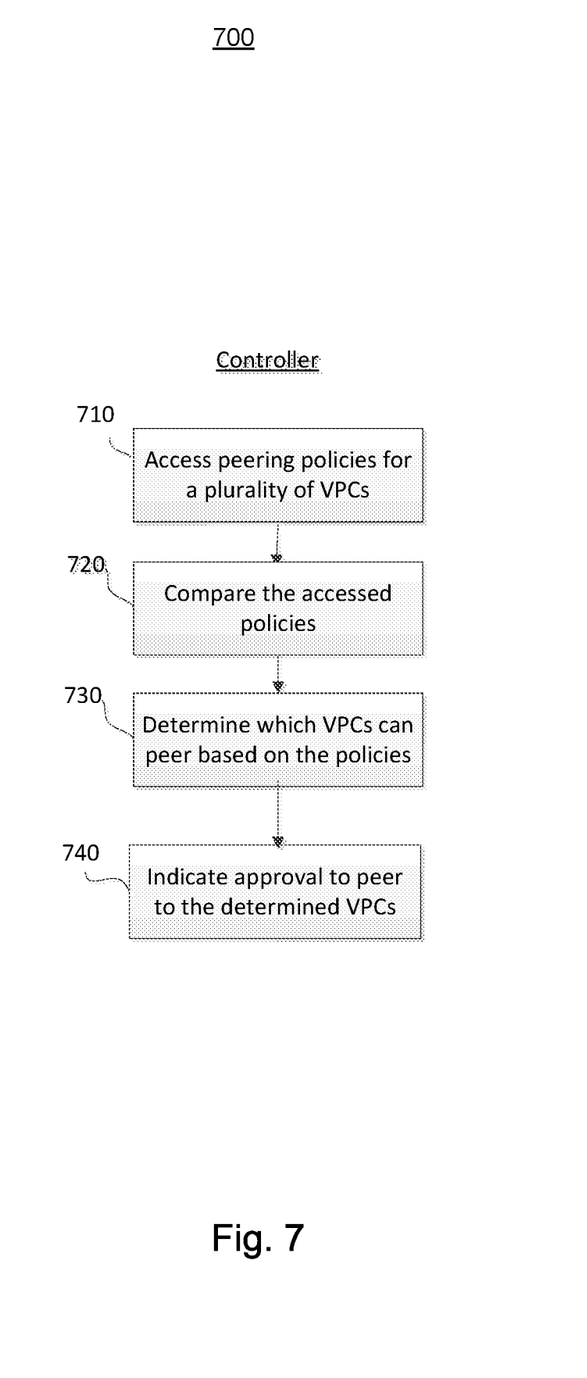
FIG. 7 is a flow diagram illustrating another example method according to aspects of the disclosure.

FIG. 7 illustrates an example method 700, wherein the controller facilitates peering using policies of the VPCs.

In block 710, the controller accesses peering policies for a plurality of VPCs. For example, the policies may be stored within the controller, at the VPCs, or in any other location accessible by the controller. Each peering policy may correspond to a particular VPC, and may indicate rules, parameters, or other guidance for peering connections allowed by that particular VPC.

In block 720, the controller compares the accessed peering policies. For example, the controller may analyze the peering policies individually or collectively.

In block 730, the controller determines, based on the comparison of block 720, which VPCs can peer with one another. For example, the comparison may return results indicating that policies of a first VPC and a second VPC have some of the same rules that allow for peering between the first VPC and the second VPC. According to other examples, the first VPC and the second VPC may have different characteristics and their policies may include different rules, but the policy of the first VPC allows for peering with the second VPC and the policy of the second VPC allows for peering with the first VPC. Accordingly, in either example, the controller may identify the first VPC and the second VPC as candidates for peering with one another.

In block 740, the controller indicates to the determined VPCs that peering between them is approved. By way of example, the controller may send a message or other communication to the first VPC and to the second VPC indicated that they may proceed to peer with one another.

Auto-peering as described herein is advantageous in that it facilitates the creation and management of multiple VPC peerings. Accordingly, VPC peerings can be created and maintained using less time, labor, and other resources. Additionally, such auto-peering reduces a potential for human error.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
    operating, by a first virtual private cloud (VPC), in a first mode, wherein the first mode enables automatic peering with a second VPC;
    identifying, by the first VPC, a second VPC;
    accessing, by the first VPC, one or more predefined policies indicating characteristics of VPCs that are approved for peering;
    determining, by the first VPC, whether characteristics of the second VPC meet the one or more predefined policies;
    automatically requesting, by the first VPC without operator intervention, to initiate peering with the second VPC when the characteristics of the second VPC meet the one or more predefined policies; and
    establishing, by the first VPC, a peering connection when the request is accepted by the second VPC without relying on bi-directional configurations.

2. The method of claim 1, wherein the one or more predefined policies specify whether an organization in which the second VPC is included is approved for peering.

3. The method of claim 2, wherein the one or more predefined policies further specify whether a project in the organization in which the second VPC is included is approved for peering.

4. The method of claim 1, wherein the one or more predefined policies limit exchange of subnets and routes.

5. The method of claim 1, further comprising pushing an automatic peering filtering policy to the second VPC.

6. The method of claim 1, wherein the second VPC is operating in either the first mode or in a second mode, wherein the second VPC listens for automatic peering requests.

7. A method comprising:
    operating, by a second virtual private cloud (VPC), in a second mode, wherein the second VPC in the second mode listens for automatic peering requests;
    receiving, by the second VPC, a request from a first VPC to initiate peering with the second VPC;
    accessing, by the second VPC, one or more policies indicating characteristics of VPCs that are approved for peering;
    determining, by the second VPC, whether to peer with the first VPC based on the one or more policies and the characteristics of the second VPC; and
    automatically peering, by the second VPC without operator intervention, with the first VPC when the first VPC is approved according to the one or more policies without relying on bi-directional configurations.

8. The method of claim 7, wherein the one or more policies specify whether an organization in which the first VPC is included is approved for peering.

9. The method of claim 8, wherein the one or more policies further specify whether a project in the organization in which the first VPC is included is approved for peering.

10. The method of claim 7, wherein the one or more policies limit exchange of subnets and routes.

11. The method of claim 7, further comprising pushing an automatic peering filtering policy to the first VPC.

12. The method of claim 7, wherein the first VPC operates in a first mode in which automatic peering is enabled.

13. A system, comprising:
    a plurality of virtual machines in a first virtual private cloud (VPC);
    a controller coupled to the plurality of virtual machines, the controller comprising one or more processors configured to:
    operate the first VPC in a first mode, wherein the first mode enables automatic peering with a second VPC based on one or more predefined policies indicating characteristics of VPCs that are approved for automatic peering;
    identify a second VPC having characteristics that meet the one or more predefined policies;
    automatically request, by the first VPC without operator intervention, to initiate peering with the second VPC; and
    establish a peering connection between the first VPC and the second VPC when the request is accepted by the second VPC without relying on bi-directional configurations.

14. The system of claim 13, wherein the one or more processors are further configured to determine whether the identified second VPC meets one or more predefined policies.

15. The system of claim 14, wherein the one or more predefined policies specify whether an organization in which the second VPC is included is approved for peering.

16. The system of claim 15, wherein the one or more predetermined policies further specify whether a project in the organization in which the second VPC is included is approved for peering.

17. The system of claim 14, wherein the one or more policies limit exchange of subnets and routes.

18. The system of claim 13, wherein the one or more processors are further configured to push an automatic peering filtering policy to the second VPC.

19. The system of claim 13, wherein the controller is further configured to operate the first VPC to:
    identify a third VPC;
    automatically request, by the first VPC without operator intervention, to initiate peering with the third VPC; and
    establish the peering connection between the first VPC and the third VPC when the request is accepted by the third VPC.

* * * * *